United States Patent [19]

Rzeszewski

[11] Patent Number: 4,989,199
[45] Date of Patent: Jan. 29, 1991

[54] PHOTONIC SWITCH ARCHITECTURE UTILIZING CODE AND WAVELENGTH MULTIPLEXING

[75] Inventor: Theodore S. Rzeszewski, Lombard, Ill.

[73] Assignee: AT&T Bell Laboratories, Murray Hill, N.J.

[21] Appl. No.: 265,118

[22] Filed: Oct. 31, 1988

[51] Int. Cl.$^5$ .............................................. H04J 14/00
[52] U.S. Cl. ......................................... 370/1; 370/18
[58] Field of Search ............... 455/600, 606, 607, 608, 455/612, 617, 616, 618, 619; 370/3, 4, 1, 16, 18, 19

[56] References Cited

U.S. PATENT DOCUMENTS

| | | | |
|---|---|---|---|
| 3,727,062 | 4/1973 | Foster ..................................... | 370/3 |
| 4,164,628 | 8/1979 | Ward ..................................... | 370/19 |
| 4,281,409 | 7/1981 | Schneider ............................. | 370/18 |
| 4,317,204 | 2/1982 | Gordy ................................... | 370/18 |
| 4,688,210 | 8/1987 | Eizenhofer .......................... | 370/18 |
| 4,703,474 | 10/1987 | Foschini .............................. | 370/18 |
| 4,748,681 | 5/1988 | Schmidt ............................... | 455/33 |
| 4,779,265 | 10/1988 | O'Connor ............................ | 370/93 |

OTHER PUBLICATIONS

Weik, "Communications Standard Dictionary", pp. 150,728 and Cover Pages, ©1983.
Alferness, "Electro Optic Guided Wave Device for General Polarization Transforms", pp. 965–969, IEEE Journal of Quantum Electronics, Vol. QE-17 #6, 6-81.
"Electronics in Telephone Switching Systems", A. E. Joel, *Bell System Technical Journal*, vol. XXXV, Sep., 1956, No. 5, pp. 991–999.
T. K. Gustafson and P. W. Smith, *Photonic Switching* (Book), Springer-Verlag, 1988, pp. 167–170.
"Measurements of the Gain Spectrum of Near-Traveling Wave and Fabry–Perot Semiconductor Optical Amplifiers at 1.5 $\mu M$", G. Eisenstein et al., *International Journal of Electronics*, vol. 60, No. 1, 1986, pp. 113–121.
"Wavelength-Selective Filters for Single-Mode Fiber WDM Systems Using Fabry–Perot Interferometers", S. R. Mallinson, Applied Optics, vol. 26, No. 3, Feb., 1987, pp. 430–436.
"Narrow Band Double-Pass Wavelength Filter with Broad Tuning Range", F. Heismann et al., Integrated and Guided Wave Optics Conference Record, Santa Fe, N. Mex., Mar. 28–30, 1988, pp. 103–106.
"THB4 Tunable and Single-Mode Fiber Refelective Grating Filter", W. V. Sorin, *Integrated Optics and Optical Fiber Communications Conference*, Reno, Nev., Jan. 19–22, 1987, p. 194.

(List continued on next page.)

Primary Examiner—Joseph A. Orsino
Assistant Examiner—L. Van Beek
Attorney, Agent, or Firm—Werner Ulrich

[57] ABSTRACT

An optical multiplexer and demultiplexer using combined code division and wavelength division multiplexing. The multiplexer comprises a plurality of code division multiplexers, each responsive to a plurality of input signals and a plurality of orthogonal code sequences, and a wave division multiplexer for generating an output signal representing the signals of each code division multiplexer carried on a different wavelength. Each code division multiplexer comprises a plurality of lithium niobate phase shifters, each comprising an indiffused titanium wave guide and a pair of electrodes for the accepting one of the orthogonal code sequences, to modulate the light wave being passed thrugh the wave guide. The demultiplexer for extracting a selected input signal, comprises a wavelength selector for selecting the wavelength carrying the selected input signal, a phase shifter for modulating the selected wavelength signal by the code sequence of the selected individual input signal, and a PIN photodiode for combining the multiplexed signal with the output of the phase shifter to extract the selected input signal. Advantageously, many signals can be multiplexed onto one path and selected separately through the combination of the code division and wavelength division multiplexing and demultiplexing.

17 Claims, 9 Drawing Sheets

BASIC MERGED CD AND WD SWITCH

OTHER PUBLICATIONS

Modulation Convertor with InGaAs/InP Multiple Quantum Wells", *Applied Physics Letters*, 52(1), Jan. 4, 1988, pp. 51–53.

Photonic Switching in Communications and Computing, IEEE Videoconferences Via Satellite, Sep. 22, 1988, pp. 5 and 28.

T. Yasui et al., "Photonic Switching System/Network Architectural Possibilities", *Photonic Switching*, Proceedings of the First Topical Meeting, Incline Village, Nevada, Mar. 18–20, 1987, pp. 25–35.

J. E. Midwinter, "Photonic Switching Components: Current Status and Future Possibilities":, *Photonic Switching*, Proceedings of the First Topical Meeting, Incline Village, Nev, Mar. 18–20, 1987, pp. 15–23.

S. Suzuki et al., "Optical Broadband Communications Network Architecture Utilizing Wavelength-Division Switching Technology", *Photonic Switching*, Proceedings of the First Topical Mtg., Incline Village, Nev., Mar. 18–20, 1987, pp. 135–136.

T. S. Rzesewski et al., "A Photonic Switch Architecture Utilizing Code Division Multiplexing", *Photonic Switching*, Proceedings of the First Topical Meeting, Incline Village, Nev., Mar. 18–20, 1987, pp. 167–170.

T. S. Rzeszewski et al., "A Photonic Switch Architecture Utilizing Code Division Multiplexing", Topical Meeting on Photonic Switching, *Technical Digest Series*, 1987, Optical Society of America, Wash., D.C., pp. 144–146, vol. 13.

R. V. Schmidt et al., "Directional Coupler Switches, Modulators, and Filters Using Alternating $\Delta\beta$ Techniques", *IEEE Transactions on Circuits & Systems*, vol. CAS-26, No. 12, Dec. 1979, pp. 1099–1101.

F. Heismann, "In-Line Electro-Optic Frequency Translator for Fiber-Optic Sensors", S.P.I.E., vol. 517, Integrated Optical Circuit Engineering, 1984, pp. 206–211.

F. Heismann et al., "Electro-Optic In-Line Frequency Translator: Performance Limitations", *Integrated Optics*, Proceedings of the Third European Conference, ECIO '85, Berlin, Germany, May 6–8, 1985, pp. 158–163.

I. Bar-Joseph et al., "Self-Electro-Optic Device &

FIG. 4

BASIC MERGED CD AND WD SWITCH

FIG. 3

CD MULTIPLEXER FOR PSK MODULATION

FIG. 2

PHOTONIC CD SWITCH WITH CONTINUOUS OPTICAL PATH

FIG. 1
BASIC CODE DIVISION SWITCH

FIG. 5

LITHIUM NIOBATE PHASE SHIFTER FOR PSK

ALTERNATIVE CD/WD DEMULTIPLEXER

FIG. 9
ADD-DROP MULTIPLEXER

4,989,199

PHOTONIC SWITCH ARCHITECTURE UTILIZING CODE AND WAVELENGTH MULTIPLEXING

TECHNICAL FIELD

This invention relates to arrangements for multiplexing and demultiplexing electrical and optical signals.

PROBLEM

Optical systems are increasingly being used for transmitting large quantities of information representing voice, video, and data. The demands for bandwidth on such optical systems keep growing as these systems are used, for example, for transmitting a large number of channels for cable television systems. In the future, such systems may be further burdened as high definition television signals become more prevalent and as the number of channels to be provided continues to grow. Such arrangements put an increasing burden on the amount of information which must be transmitted over the optical fiber.

Optical transmission systems, in contrast to coaxial cable systems, almost invariably use digital signaling to transmit information. Among the multiplexing schemes which can be used to multiplex a large number of digital signals onto a single lightwave carrier system is code division multiplexing. Code division multiplexing is a process whereby a number of input signals are each orthogonalized before being added together, so that each signal can later be extracted individually, uncorrupted by the presence of the other signals. Extraction is usually accomplished through a correlation process. The coding is usually accomplished through a special code sequence which multiplies the input signal or phase modulates the carrier of the input signal.

Another arrangement for multiplexing a number of different signals onto an optic transmission system is to use wavelength division multiplexing whereby each group of digital signals modulates a different wavelength of light and all the wavelengths are carried simultaneously on the optic fiber.

However, even with the best available optic transmission modulation systems, there still is a need for additional bandwidth and further there is not a satisfactory economical arrangement for extracting a specific signal from an optic transmission system which is carrying a large number of different signals. The latter function is required, for example, for a receiver of cable television signals.

SOLUTION

The above problems are solved and an advance is made in the state of the art in accordance with principles of my invention wherein, illustratively, a combination of code division and wavelength (frequency) division signals is carried by an optic transmission or switching system and wherein, advantageously, a merged decoder is used for extracting the signal carried by any code of any wavelength of the optic system. The decoder comprises a group of optical modulators each tuned to a different wavelength; only one of these optical modulators corresponding to the desired wavelength is made active. The output of that optical modulator is combined in a phase shifter with the code sequence of the selected signal. When the output of the phase shifter is combined with the input signal in a PIN photodiode for optic detection, the electrical output of the PIN diode represents the desired signal.

More generally, these arrangements of encoders and decoders can also be used for electrical systems. Since wavelength and frequency are related, it is possible to refer to either. For convenience, and because the exemplary embodiment uses photonics, wavelength is used through this specification.

In accordance with one aspect of the invention combined code and wavelength division modulation is achieved by a combination of a plurality of code division multiplexers acting as inputs to a wave division multiplexer. Each code division multiplexer comprises a plurality of phase shifters, each of which have a signal input and a code sequence input. The output of these phase shifters is then combined in a passive optical coupler which is used as one of a plurality of inputs to a wave division multiplexer. The wave division multiplexer comprises a series of wavelength converters for taking the outputs of the code division multiplexers, all of which are at the same wavelength, and converting these outputs to the different wavelengths. The outputs of the wavelength converters are then combined with a passive optical coupler.

In accordance with another embodiment of the invention, a switch comprises a combined code division and wavelength division multiplexer whose output is connected to the input of a plurality of the code division/wavelength division decoders.

In accordance with another aspect of the invention, a switch for extracting and inserting a plurality of signals into an optical transmission system is implemented as follows. The outputs are extracted using a plurality of the merged decoders as described above. Inputs are added by generating standard outputs of the code division multiplexers and converting their wavelength to ones of the wavelengths not used in the output of the switch. These outputs are then combined with inputs used in the output of the switch by a passive coupler. Advantageously, such an arrangement permits a large number of signals to be added and extracted at one point in an optical transmission system.

In accordance with another aspect of the invention, signals are maintained in the optical domain throughout the encoding process and through the decoding process until the output of the demodulator which is an electrical output is produced by the decoder.

In accordance with one specific embodiment, the phase shifter is a lithium niobate device having electrical inputs representing the code sequences applied at the electrodes of a phase shifter in which a basic lithium niobate crystal has a titanium diffused waveguide that passes through the crystal. The titanium at the surface is surrounded on the two sides by the electrodes containing the electrical signal that represents the code sequence. In accordance with one aspect of the invention, the merged decoders can be widely distributed to a number of stations which receive a broadcast wideband signal. Such an arrangement provides the capability for any station to extract the desired signal from the large number of signals being transmitted.

In an alternative embodiment of the combined decoder, optical output is produced by using in series a tunable optical filter for selecting the wavelength, a wavelength converter for converting the selected wavelength to a standard wavelength, and a phase shifter, responsive to a selected orthogonal input sequence for selecting the desired signal.

Therefore, in accordance with the principles of this invention, a demultiplexer of a combined wavelength (frequency)/code division multiplex signal comprises a wavelength selector, for selecting the correct wavelength, which drives a combining circuit for combining a selected orthogonal sequence with the selected wavelength signal, and the output of the combiner is used to extract the desired output signal from the multiplex signal. A multiplexer comprises a plurality of code division multiplexers, each driving a wavelength converter for generating a signal at a different wavelength, and a means for combining the outputs of the wavelength converters to generate the multiplexed output signal.

DETAILED DESCRIPTION

1. Introduction

The use of Code Division Multiplexing (CDM) in a photonic switch has been described in T. K. Gustafson and P. W. Smith, *Photonic Switching* (book), Springer-Verlag, 1988, pp. 167-70. CDM can be used to make each input channel orthogonal to every other input channel so that the sum of all the orthogonalized input channels can be presented to a decoder at each output port of the switch. The actual output signal on each port can be selected to be any one of the input signals by using the appropriate code for selection. This is possible because of the correlation property of an orthogonal code family.

$$\int_0^T \phi_i \phi_j(t) dt = 1 \text{ for } i = j \qquad (1)$$
$$= 0 \text{ for } i \neq j$$

$\phi_i$ and $\phi_j$ are members of the code family that are used to orthogonalize the input bits, and T is the duration of any code sequence and the duration of any input bit. This is the means by which any input signal can be switched to any or all outputs (customers). Therefore, the resultant switch is non-blocking with broadcast capability.

Figure 1:
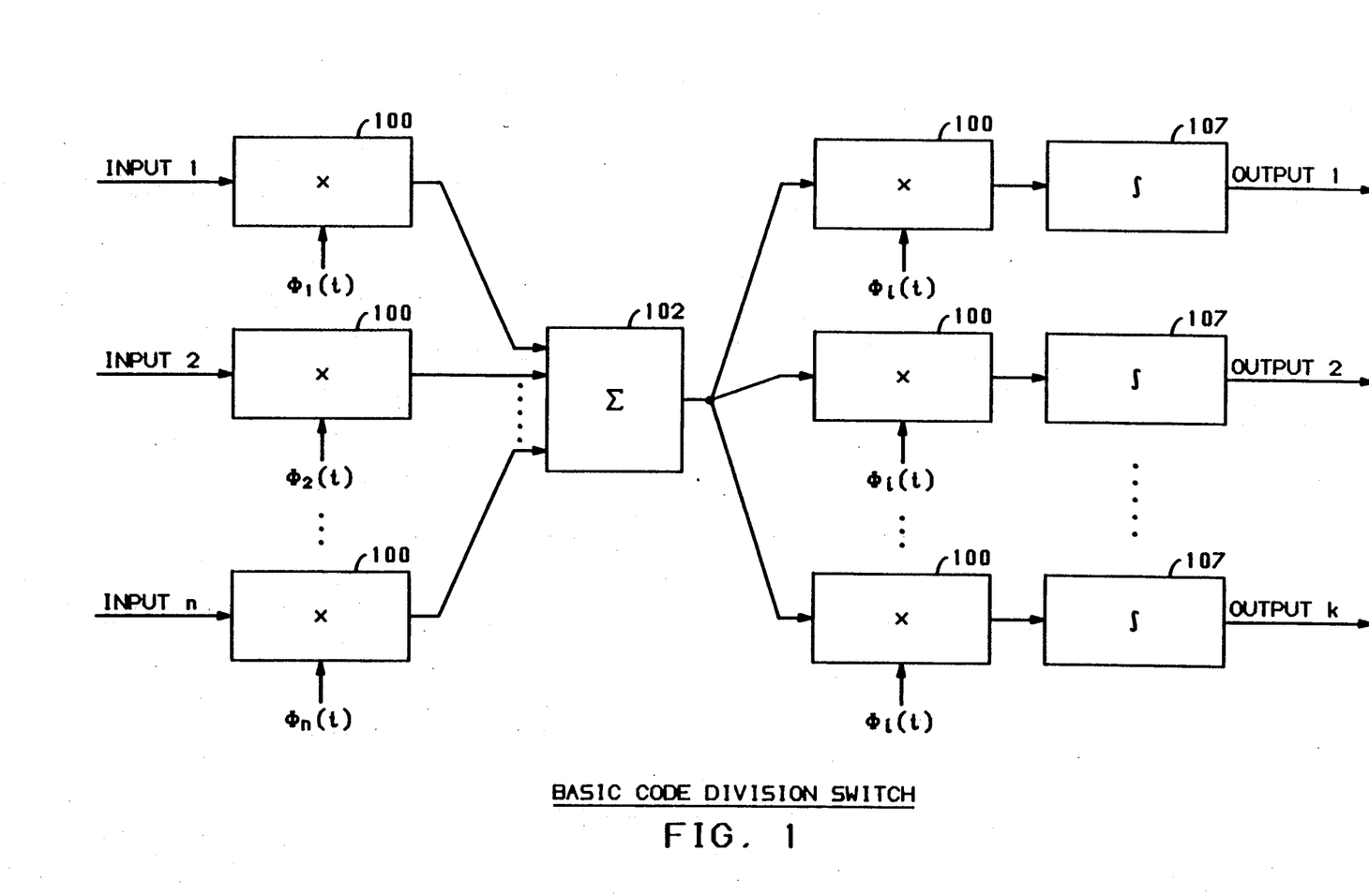
FIG. 1 is a conceptual diagram of a code division switch.

The basic structure of a switch that uses an orthogonal code family is shown in FIG. 1. Members of a first group of n multipliers 100 are each connected to one of the inputs, input 1, input 2, ... input n, and to a member of the orthogonal code sequence set, $\phi_1(t), \phi_2(t), \ldots, \phi_n(t)$, respectively. The outputs of each of the n multipliers are connected to a summing circuit 102 whose output in turn is connected to a second group of multipliers 100, each of which has as one input the sum signal (i.e., the output of summing circuit 102) and an appropriate one of the code sequences for selecting the desired signal. The output of each second block 100 is connected to an integrator 107 whose output represents the selected signal, i.e., the input associated with the coding sequence that is applied to the multiplier 100.

In mathematical terms, the input signals are each multiplied by the different members of the orthogonal code family. Therefore, the orthogonalized inputs can be represented as $\phi_i(t)$ x input bits, where the input bits are a 1 or $-1$ for a duration of T, and $\phi_i(t) = 1$ or $-1$ for a duration T/n. If the input is a baseband signal, the output is a baseband signal of n times the input bandwidth.

Therefore, an input to the summing circuit can be expressed as, $$m_i(t)\phi_i(t) \qquad (2)$$

where $m_i(t)$ is the information ($+1$ or $-1$) and $\phi_i(t)$ is the orthogonal code for input channel i. The output from a multiplier on the right of FIG. 1 that is also fed with $\phi_i(t)$ is:

$$m_1(t)\phi_1(t)\phi_i(t) + \ldots$$
$$+ m_{i-1}(t)\phi_{i-1}(t)\phi_i(t) + m_i(t)\phi_i^2(t) + m_{i+1}(t)\phi_{i+1}(t)\phi_i(t) + \qquad (3)$$

All the unwanted cross terms with $\phi_i(t)\phi_j(t)$ will integrate to zero from equation 1, and the output from the integrator in FIG. 1 becomes:

$$m_i(t)\phi_i^2(t) \qquad (4)$$

If $\phi_i(t)$ is a polar orthogonal code sequence, $\phi_i^2(t)$ is unity. Therefore, the decoder output becomes $m_i(t)$.

If the input entering one of the first blocks 100 of FIG. 1 is in optical form, it is already modulated typically as on-off keying or phase shift keying (PSK). Since the $\phi_i(t)$ waveforms repeat for each information bit, the output from any of the multipliers on the left is a PSK signal modulated at the rate determined by $\phi_i(t)$. This happens because $\phi_i(t)$ will either multiply the input by a $+1$ or $-1$. A PSK signal can be represented by using an optical carrier $\cos \omega_c t$ in equation 2; equation 2 becomes $\phi_i(t) m_i(t) \cos \omega_c t = \pm \cos \omega_c t$ and equation 4 becomes:

$$m_i(t)\phi_i^2(t)\cos^2\omega_c t = \frac{m_i(t)}{2}(1 + \cos 2\omega_c t), \qquad (5)$$

since the coherent detection of the optical signal is being performed by injecting both the optical information signal and the optical carrier into a Positively doped-Intrinsic-Negatively doped (PIN) photodiode which approximates a multiplier if the optical carrier is much larger than the optical information signal. After the output integrator, $m_i(t)/2 = \pm\frac{1}{2}$. This is an electrical domain version of the desired polar input signal multiplied by one half. There are times when it is desirable to stay in the optical domain. The following technique can be used to accomplish this goal.

If the input is in optical form, it is already modulated typically as on-off keying (intensity modulation) although phase shift keying (PSK) is preferred for coherent optical communications. In either case, a bandpass system rather than the baseband system of FIG. 1 is required. Since the $\phi_i(t)$ waveforms repeat for each bit, the output from any of the multipliers on the left of the new bandpass version of FIG. 1 is a PSK signal modulated at the rate determined by $\phi_i(t)$. This happens because $\phi_i(t)$ will either multiply the input by a $+1$ or $-1$. For a PSK signal equation 2 becomes $\phi_i(t)m_i(t) \cos \omega_c t = \pm\cos \omega_c t$ and equation 4 becomes, $$m_i(t)\phi_i^2(t) \cos \omega_c t = m_i(t) \cos \omega_c t \qquad (6)$$

after the output bandpass integrator. This is a modulated version of the desired polar input. In actual optical implementation, a phase shifter can be used to make the high frequency PSK optical signal under the control of the high frequency orthogonal code that repeats within a given information bit interval. Further, the decoder can be another phase shifter followed by a narrow band optical filter if it is desired to maintain a continuous optical path between input and output.

Figure 2:
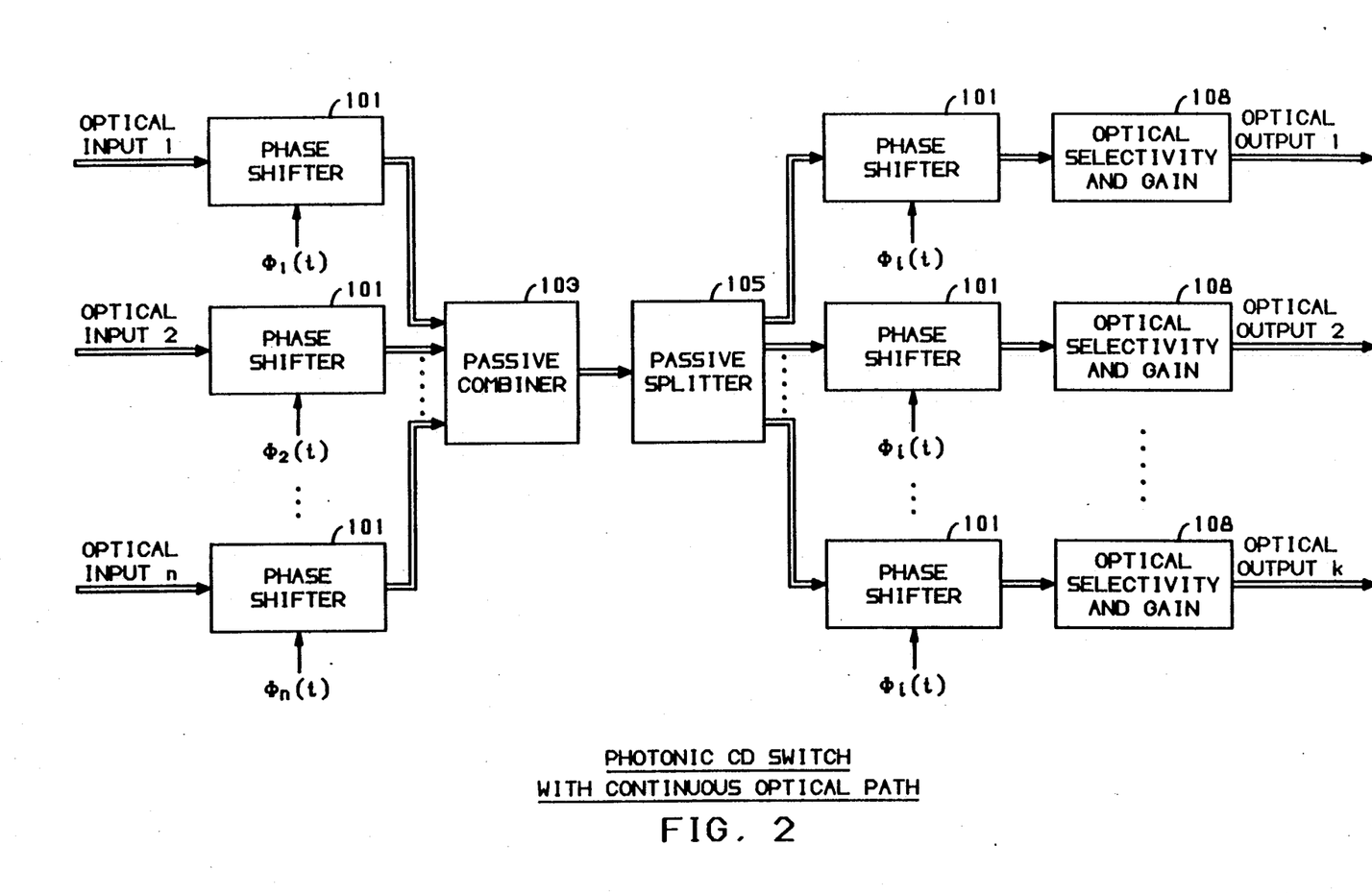
FIG. 2 is a diagram of a photonic code division switch.

This is illustrated in FIG. 2 which shows physical instead of mathematical elements. The phase shifters 101, the equivalent of the multipliers 100 of FIG. 1 are each controlled by a separate orthogonal sequence $\phi_1(t), \phi_2(t), \ldots, \phi_n(t)$. The output of phase shifters 101 are connected to a passive combiner 103, comparable to the summer 102 of FIG. 1. The output of passive combiner 103 is connected to the input of passive splitter 105 whose outputs are the inputs to the second group of phase shifters 101. The outputs of each member of the second group of phase shifters 101 is connected to a circuit 108 for providing optical selectivity and gain.

If it is required to add more inputs to this type of a code switch, it is necessary to increase the bandwidth requirements of the switch proportionally. Therefore, the switch size on the input becomes limited by the bandwidth of the individual components that are available to implement the switch. The output size of the switch is limited by the losses associated with the combining circuit 103, and power splitting in the passive splitter 105.

One strategy for a switch design or transmission system design that must accommodate a large number of input channels is to group the input channels into m groups of n channels. The total number of input channels that this switch could handle is equal to n×m. A CD multiplexer is utilized for each group of n channels, and n is chosen to produce a high frequency operation consistent with the bandwidth of the technology that is used for implementation. This approach makes the speed requirement, and therefore the bandwidth, of the circuitry needed to implement a switch with n×m inputs equal to the requirement for an n input CD multiplexer; a speed reduction by a factor of m compared to that of a CD multiplexer that must handle n×m inputs. A CD multiplexer 109, is shown in FIG. 3, and comprises a plurality of phase shifters 101 and a passive combiner 103.

Figure 3:
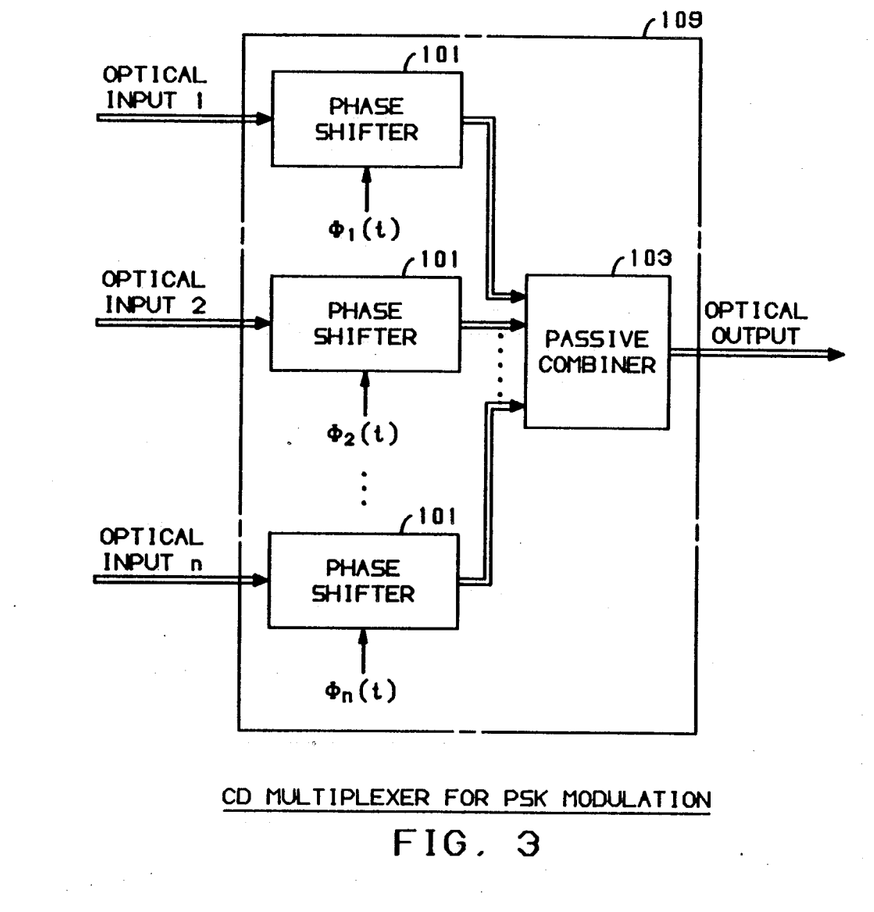
FIG. 3 is a diagram of a photonic code division multiplexer.
Figure 4:
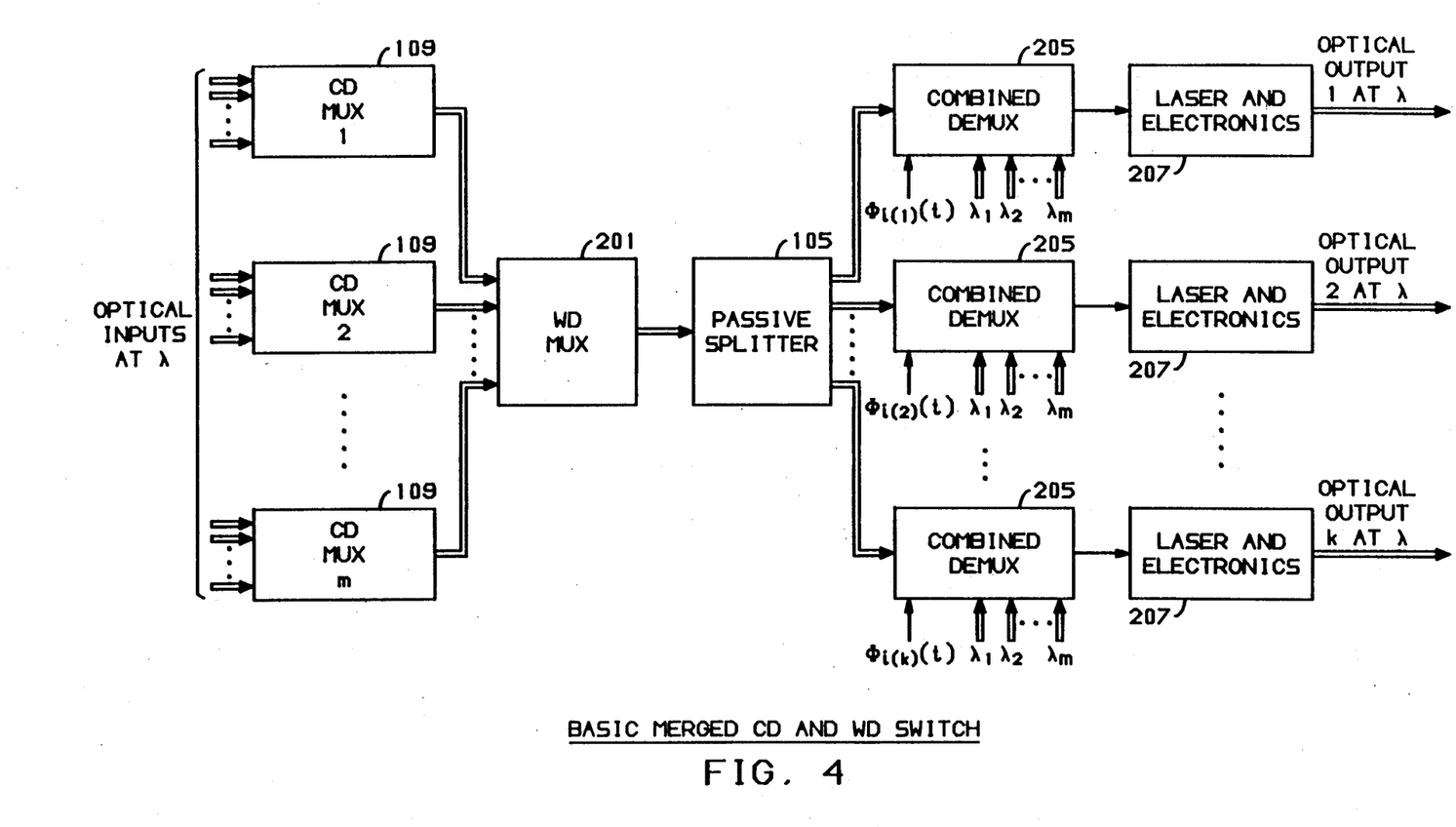
FIG. 4 is a diagram of a photonic code division/wavelength division switch.

FIG. 4 shows a complete n×m switch comprising m CD multiplexers 109, each with n inputs as shown in FIG. 3; a wavelength division (WD) multiplexer 201, discussed hereinafter with respect to FIG. 6; and a passive splitter 105 for distributing the output of WD multiplexer 201 to k different combined wavelength-/code division demultiplexers 205, discussed hereinafter with respect to FIG. 7. The number of output ports, k, is limited by the fanout capability from the wavelength division multiplexer 201 and passive splitter 105. If the passive splitter cannot provide sufficient power to each output port, optical amplification is used to boost the power.

Wavelength division multiplexing (WDM) is the name given to frequency division multiplexing in the optical domain and can also be used in the electrical domain since frequency and wavelength are related. There is great interest in WDM by the use of coherent lightwave communication. The main reason is that a potentially large number of channels can be multiplexed and subsequently demultiplexed (separated) because the high selectivity filtering requirements can be accomplished in the electrical domain after the photodetector. This avoids the necessity for high selectivity in the optical domain. However, if a switch or transmission system with a large number of inputs is needed, there is a requirement for a large number of stable light sources to make each input orthogonal to every other input by translating each input channel to a different wavelength. The switch or transmission system outputs are selected by coherent detection of the optical signal. This requires a coherent carrier that is the proper frequency (wavelength) and phase. This in turn requires a large number of tunable lasers that can be phase locked properly or the multiplexing of a stable replica of each frequency (wavelength) on each output port for demodulation.

An advantage can be obtained by utilizing both CDM and WDM techniques because both can share a common detector (PIN) and the number of precision lasers needed for modulation and detection can be reduced by a factor of n by combining the two techniques in a single switch, as illustrated in FIG. 4.

The output fiber from the WD multiplexer carries m wavelengths and each wavelength is modulated with n CDM input channels. Therefore, every output is presented with all n×m inputs to the switch, and the switch has broadcast capability. Further, the speed requirements of CDM and the number of precision lasers required for WDM are both moderated by combining or merging CDM and WDM. Before considering the merged CD/WD architecture further, it is noted that the basic architecture illustrated in FIG. 4 can also be used to make a code division/space division (CD/SD) switch by replacing the WD multiplexer with a non-blocking space switch. Now the demultiplexer on the right of FIG. 4 is just for CD and the output could stay in optical form if desired.

2. Code Division/Wavelength Division Architecture

The basic merged code/wavelength division architecture is illustrated in FIG. 4. The code division multiplexer 109, illustrated in detail in FIG. 3, can be implemented by using one member of an orthogonal code family to modulate each information bit by shifting the phase of the optical carrier during the bit interval to be in phase half of the time and 180 degrees out of phase during half of the bit interval time. This phase shift is controlled by one unique sequence from an orthogonal code family for each input channel. The resultant signal will be inphase during the time when the code has logical zeros and out of phase when the code is producing logical ones; this is phase shift key (PSK) modulation. This results because of the polar nature of the $\phi$ signals; then two states are $\pm 1$. When the incoming carrier is multiplied by $+1$, its phase is unaffected; when multiplied by $-1$, a 180° phase shift is effected. Thus the phase shift circuit 101 of FIG. 3 is equivalent to the multiplier 100 shown in FIG. 1. Next, all the input signals that have been PSK modulated in block 101 are added together in a passive combiner 103 comparable to the summer 102 of FIG. 1, to form the CD multiplexer 109.

Figure 5:
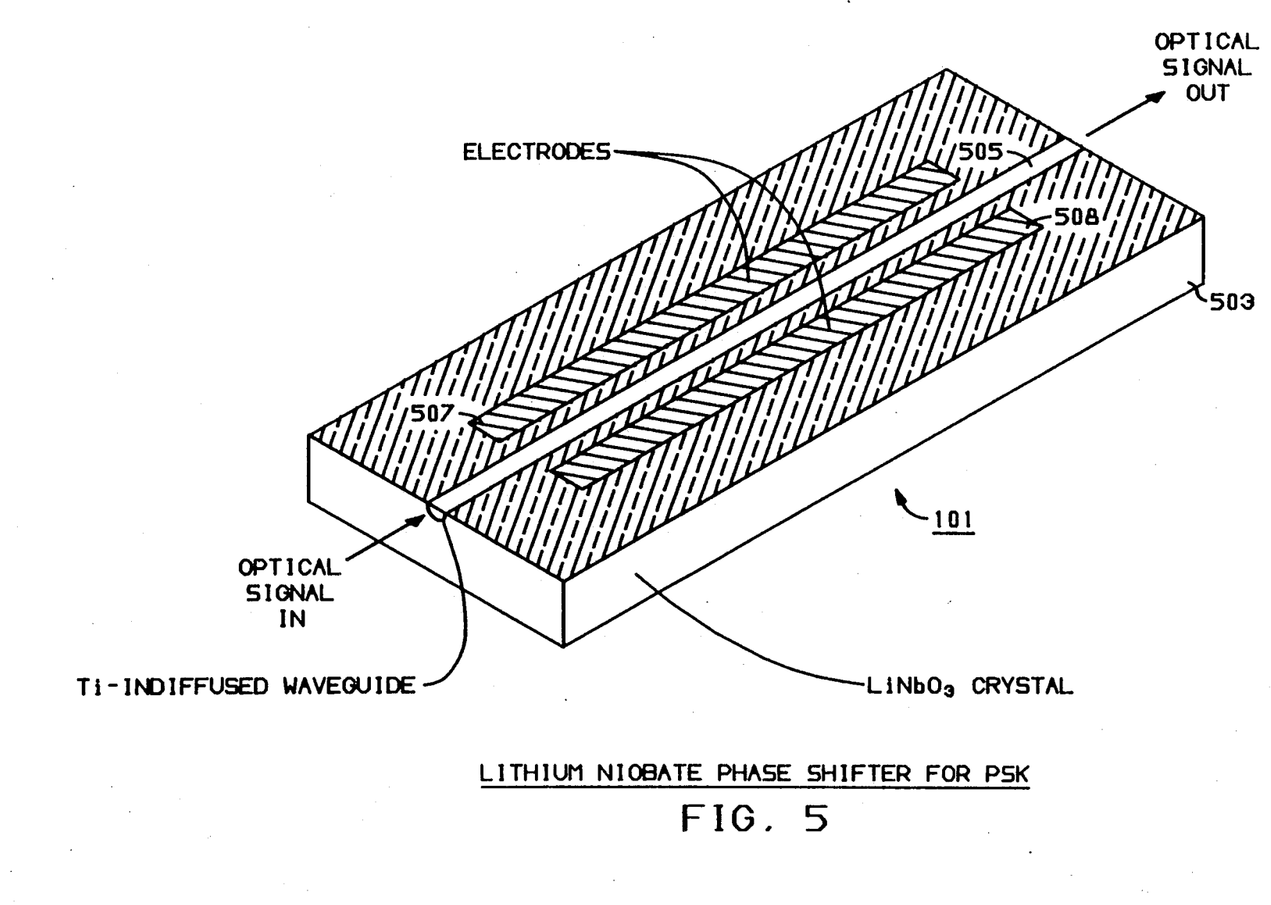
FIG. 5 is an illustration of a phase shifter for use in a code division multiplexer and demultiplexer.

The phase shifter can be realized by utilizing titanium diffused waveguides in lithium niobate with metal electrodes on the surface near a portion of the titanium channel. There is a change in the index of refraction of the material when an electrical signal is applied to the electrode, this produces the desired phase shift in the optical signal that is propagating in the waveguide.

The device is illustrated in FIG. 5 which shows a lithium niobate phase shifter for phase shift keying the optical signals. A lithium niobate crystal 503 has a narrow and shallow titanium indiffused waveguide 505 along its length. The waveguide is surrounded on two sides by electrodes 507 and 508 which are connected to the electrical modulating signal. The optical input signal is injected at one end of the waveguide and the output appears at the other end.

The output of the phase shifter is the desired phase shift keyed (PSK) optical signal. Each orthogonal code word that controls the phase of the incoming signal lasts for exactly the duration of an information bit, and then repeats for the next and all subsequent information bit time intervals. The bandwidth of each coded input channel is increased by a factor that equals the number of bits in the length of the orthogonal code family. However, all the coded input channels occupy the same spectral density (frequency range). Further, all the coded channels may be added together and later be separated by correlating each coded channel with the appropriate member of the code family that was used for encoding, as suggested by equation 4. This will be performed on the output of the switch to select any input that is desired. However, the center block in FIG. 4, the wavelength multiplexer 201, will be described first.

Figure 6:
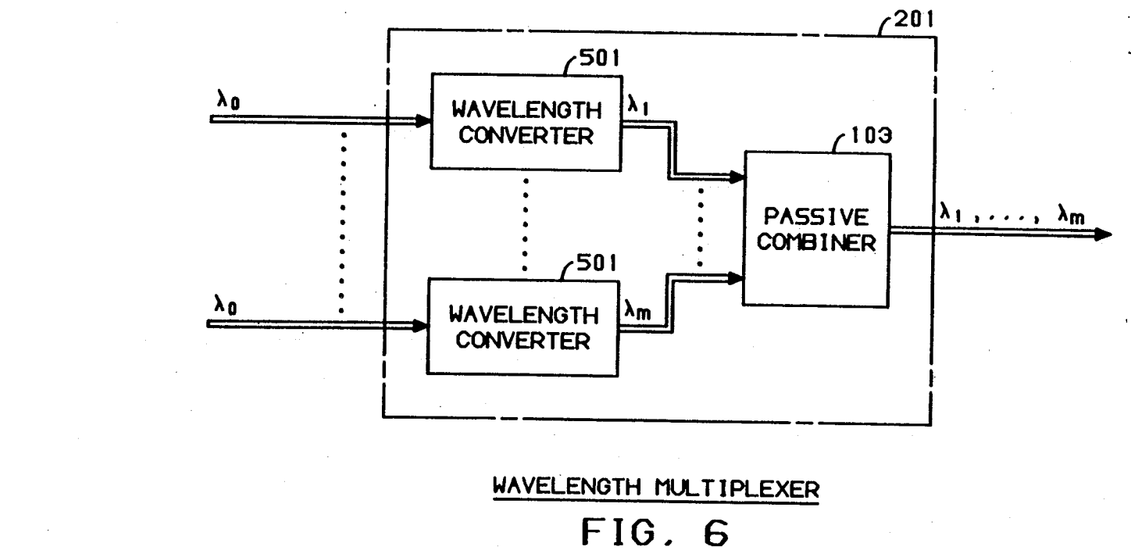
FIG. 6 is a diagram of a wavelength multiplexer.

The function of the wavelength multiplexer 201, shown in detail in FIG. 6, is to shift the wavelength of the incoming channels from the value $\lambda_0$, that is used for transmission, probably 1.3 or 1.5 $\mu$m, to one of the selected values, $\lambda_1, \ldots, \lambda_m$, for wavelength multiplexing, using a plurality of wavelength converters 501, additively combined by a passive combiner 103. The output of the WD multiplexer is a single optical signal that contains the sum of the outputs from the CD multiplexers; each CD multiplexer output is translated to a predetermined wavelength by the multiplexer.

The output signal from the WD multiplexer 201 in FIG. 4 is passed through a passive splitter 105 that splits the signal into equally weighted parts, one for each demultiplexer 205. Each demultiplexer 205 has as inputs representing the wavelengths $\lambda_1, \ldots, \lambda_m$, and a selected code sequence, one of the k code sequences $\phi_{i(1)}(t)$, $\phi_{i(2)}(t), \ldots, \phi_{i(k)}(t)$. Each demultiplexer 205 drives an attached laser and electronic circuit 207 to generate an optical output. The output circuitry combines the demultiplexing of both the code division and the wavelength division processes in one detector.

Figure 7:
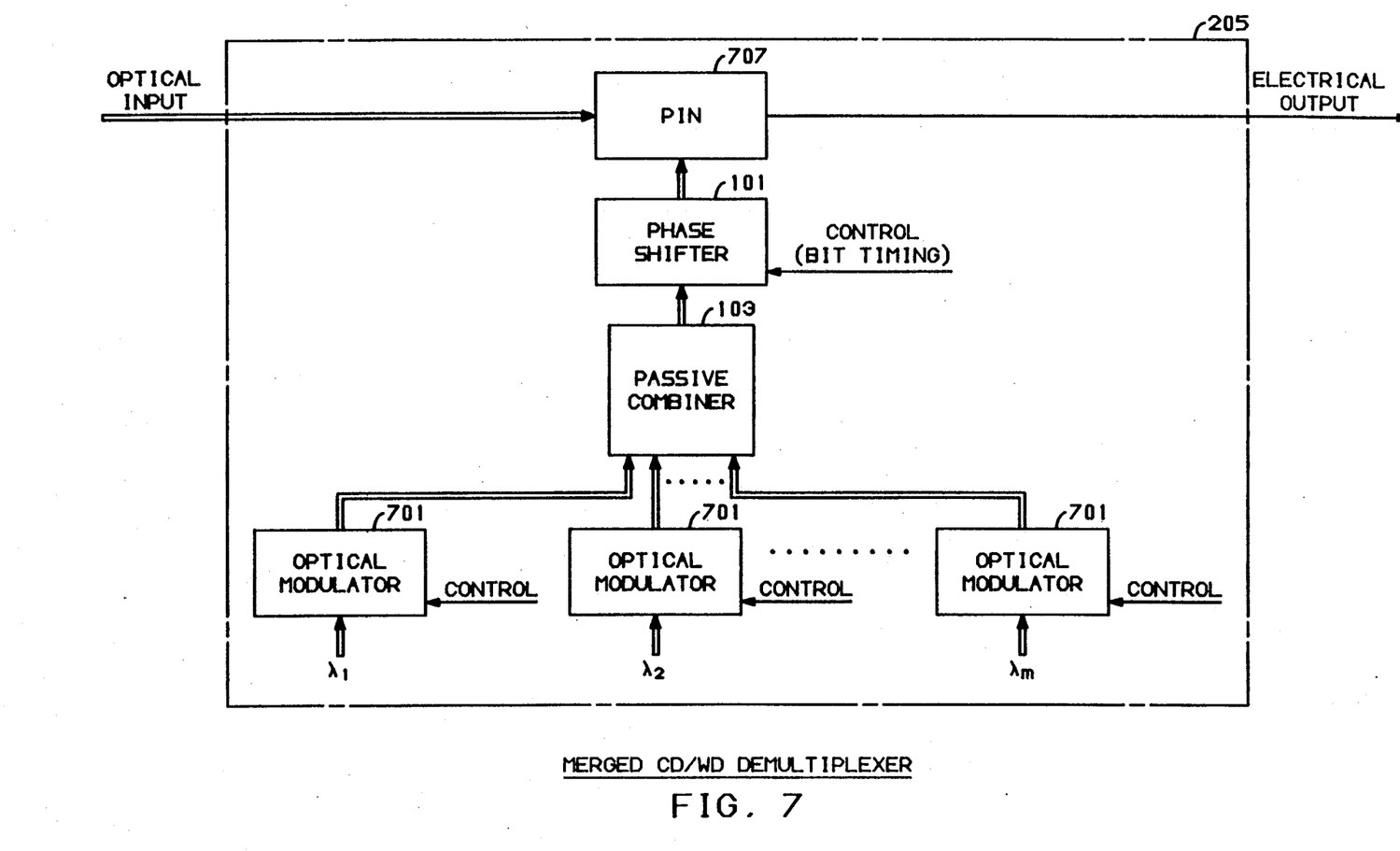
FIGS. 7 and 8 are diagrams of code division/wavelength division demultiplexers.

The circuit of block 205 is shown in FIG. 7. The circuit includes m optical modulators 701 each with an input of one of the wavelengths $\lambda_1, \ldots, \lambda_m$ and each having an attached control signal so that only the selected one of these optical modulators is turned on. These optical modulators are lithium niobate optical modulators in the exemplary embodiment of the invention. The output of these optical modulators is combined in a passive coupler 103 which is connected to a phase shifter 101 whose other input is the selected code sequence. The output of this phase shifter is then connected to the PIN detector 707 which combines this signal with the combined optical input signal to generate the selected electrical output. This electrical signal now feeds block 207 (FIG. 4) which contains the appropriate and well-known electronics to filter, amplify, and drive a laser diode also contained in block 207.

A passive splitter 105 may not provide sufficient energy to drive the required number of demultiplexers. In that case, an optical amplifier would be required at the input to passive splitter 105. A traveling wave or Fabry-Perot optical amplifier can provide the required amplification. This is described in G. Eisenstein et al.: "Measurements of the Gain Spectrum of Near-Traveling Wave and Fabry-Perot Semiconductor Optical Amplifiers at 1.5 $\mu$m," *International Journal of Electronics*, vol. 60, no. 1, 1986, pp. 113–121.

A PIN or avalanche photo diode (APD) 707 (FIG. 7) is used to perform the coherent detection needed for demultiplexing both multiplexing schemes (both CD and WD) simultaneously. This is accomplished by selecting a portion of the same source that is used in the wavelength multiplexing process illustrated in FIG. 5 as a second signal to be fed into the PIN. Since the diode produces an output electrical signal that is proportional to the input optical power input, it is acting as a square law device. The detector output, E(t), is given by the following expression.

$$E(t) = \{[A + m(t)]\cos\omega_c t\}^2 \quad (7)$$
$$= \frac{[A^2 + 2Am(t) + m(t)^2]}{2}(1 + \cos2\omega_c t)$$

A is the optical carrier amplitude and m(t) is the information signal. The lowpass filter output $y_0(t)$ is $$y_0(t) = \frac{A^2}{2}\left[1 + \frac{2m(t)}{A} + \frac{m(t)^2}{A^2}\right] \quad (8)$$

It is obvious that there is a distortion term present in the conventional form of optical homodyne detection that is not present in the pure product detector that is normally used for electrical homodyne detection. However, if the optical carrier is made large enough, m(t)/A<<1, compared to the optical information signal, this distortion term can be made negligible. Therefore, the optical carrier needs to be sufficiently larger than the information signal to ensure reliable digital detection. Also, if the LPF is AC coupled, the output is given by the following.

$$y_0 \approx Am(t) = \pm A \quad (9)$$

FIG. 6 is a block diagram of wavelength division multiplexer 201 of FIG. 4. Each of a plurality of signals at wavelength $\lambda_0$ is connected to a wavelength converter 501 to generate a signal at one of the wavelengths $\lambda_1, \ldots, \lambda_m$, which are combined in combiner 103. Wavelength division multiplexers are known in the prior art and described, for example, in I. Bar-Joseph et al: "Self-electro-optic Effect Device and Modulation Converter in InGaAs/InP Multiple Quantum Wells", *Applied Physics Letter*, vol 52, no. 1, Jan. 4, 1988, page 53. These wave division multiplexers comprise means for changing the wavelength of a modulated signal such as an integrated circuit with two multiple quantum well (MQW) diodes 601 connected in series, one of the diodes comprising material responsive to an input wavelength, the other diode comprising material responsive to the desired output wavelength.

Figure 8:
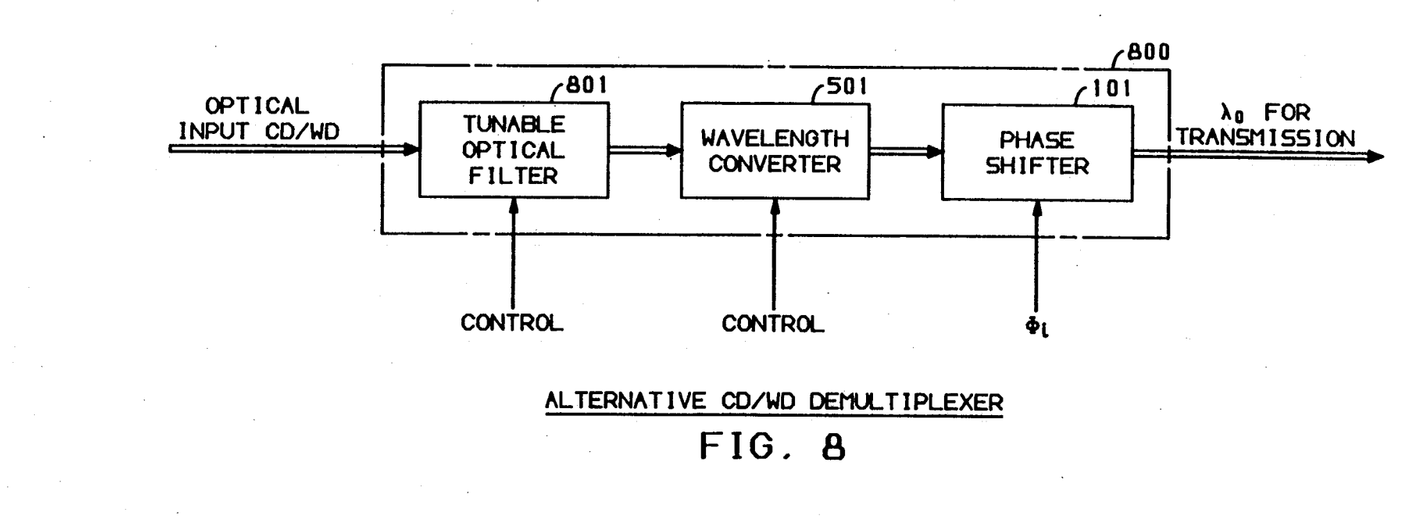

FIG. 8 shows an alternative embodiment of a CD/WD demultiplexer 800, operating in the optical domain. If demultiplexer 800 is used instead of demultiplexer 205 and laser and electronics 207, then the switch of FIG. 4 operates in a fashion to provide a continuous optical path from input to output. Demultiplexer 800 comprises a tunable optical filter 801, operative under electrical control, for selecting a wavelength. This wavelength is transmitted to a wavelength converter 501 whose output is a light signal of the standard wavelength $\lambda_0$. If the wavelength converter 501 cannot be made sensitive to all outputs of the tunable filter 801, then a group of wavelength converters 501 can be placed in parallel and the appropriate converter output gated for transmission to phase shifter 101. The output of wavelength converter 501 is then transmitted to phase shifter 101, controlled by an electrical signal representing the selected orthogonal sequence $\phi_i$. The output of phase shifter 101 then is a light wave of the standard wavelength $\lambda_0$, modulated only by the selected signal. Tunable optical filters are well known in the art and are discussed, for example, in S. R. Mallinson: "Wavelength-Selective Filters for Single-Mode Fiber WDM Systems Using Fabry-Perot Interferometers", *Applied Optics*, vol. 26, no. 3, Feb. 1987, pages 430–436; F. Heismann et al.: "Narrow Band Double-Pass Wavelength Filter With Broad Tuning Range", *Integrated and Guided Wave Optics Conference Record*, Santa Fe, New Mexico, Mar. 28–30, 1988, pages 103–106; and W. V. Sorin et al.: "THB4 Tunable and Single-Mode Fiber Reflective Gating Filter", *Integrated Optics and Optical Fiber Communications Conference*, Reno, Nevada, Jan. 19–22, 1987, page 194. Alternatively, the relative positions of the wavelength converter and phase shifter may be reversed; the arrangement shown in FIG. 8 offers the advantage of permitting a phase shifter to work at one wavelength.

The switch architecture described above merges CDM with WDM to moderate the more difficult requirements of each approach when a large switch or transmission system is required. A potential application for an optical switch in the local environment is likely in the 1990's since broadband ISDN (B-ISDN) is likely to become a reality in the early or mid 1990's. Such a system requires individual video channels with a minimum data rate of 45 Mb/s for present TV signals and data rates as large as 400 Mb/s are expected for high definition TV (HDTV) signals. It is likely that a rate of about 140 Mb/s will be used as a common rate for both the USA and Europe. These systems will use switches that may require approximately 100 inputs to be competitive with CATV systems. Further, it is likely that an enhanced level of TV quality (preferably high definition quality if the cost is not too high) will be required to show product improvement for B-ISDN over the present CATV.

These inputs should be switched to hundreds and perhaps thousands of outputs (customers). If 16 channels are CD multiplexed together on the input of a switch illustrated in FIG. 4, and six wavelengths are used in the WD multiplexer, the switch can accept 96 input channels. These inputs can be sent to any of hundreds and potentially thousands of outputs if the fanout capability of the technology used will permit.

Instead of making one code switch that will accept 96 inputs and require processing at 96 times the data rate of the input channels (as high as $96 \times 140$ Mb/s = 13.4 Gb/s), the resultant upper limit for data rate is only $16 \times 140 = 2.24$ Gb/s. Alternatively, if a WD switch were used for all 96 inputs, it would require 96 wavelengths, multiplexed lasers or tunable phase-locked lasers. However, this switch only requires 6 wavelengths.

The output ports of the merged switch are almost the same complexity as if a CD or WD switch were implemented and the input ports only require simple phase shifters, a relatively simple device. Since the center stage only requires 6 wavelengths in a WD multiplexer, it is simpler than a pure WD switch. The result is a switch that could be implemented if the fanout requirements can be met. The fanout requirements equal the number of switch outputs (customers).

The arrangement of FIG. 4 can be used as a switch with a plurality of inputs to each of the CD multiplexers 109 and a plurality of outputs, one from each of the combined demultiplexers 205. For applications such as cable television, the output of the WD demultiplexer 201 is connected to a fiber for distribution and each of the demultiplexers 205 are connected to a tap on that cable.

Figure 9:
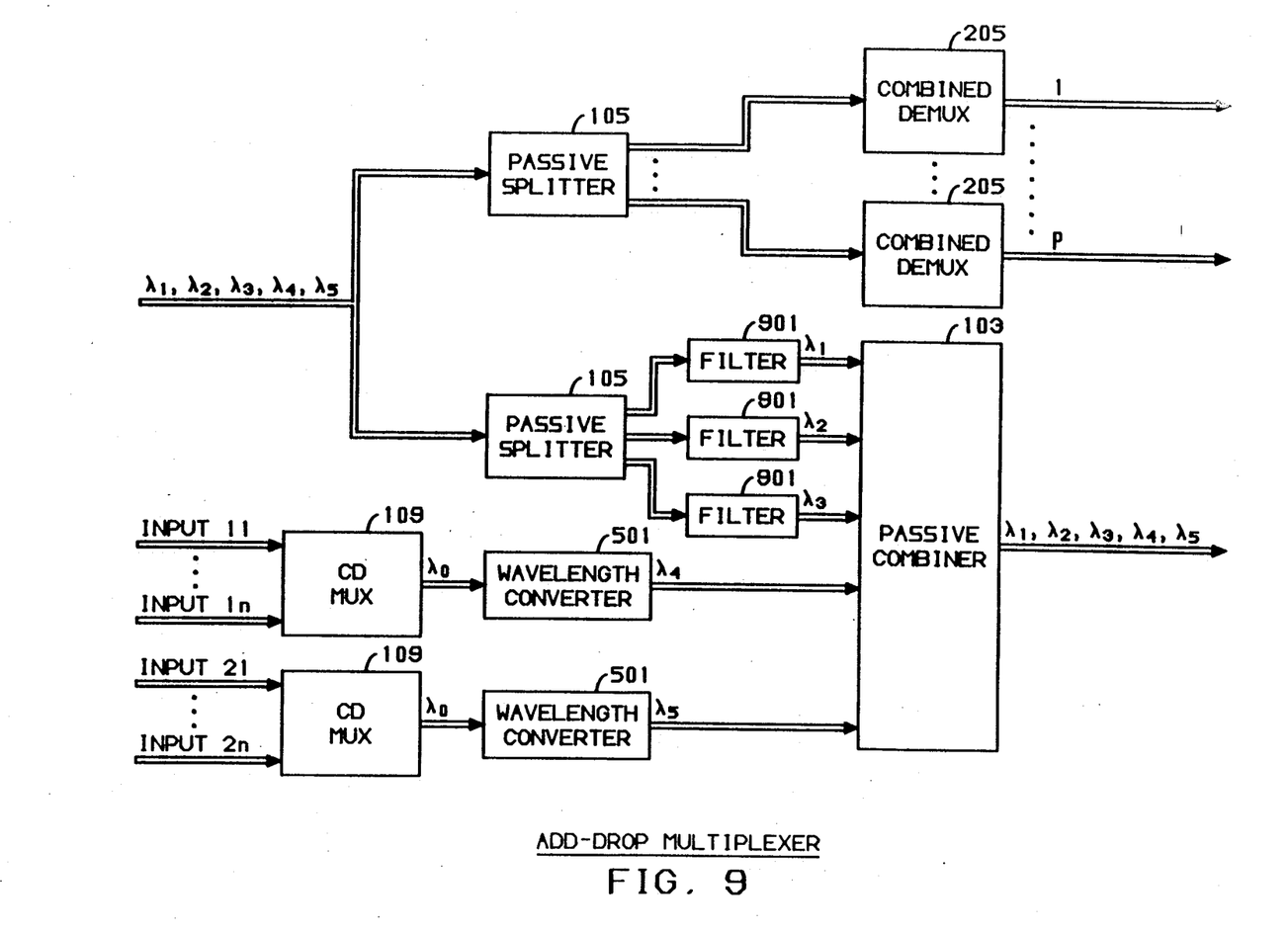
FIG. 9 is a diagram of an add/drop multiplexer.

For add-drop multiplexing applications in which a plurality of signals are withdrawn at a switch and another plurality of signals are injected into the optical signal at that switch, the configuration of FIG. 9 may be used. In this example, an incoming light signal has components at wavelengths $\lambda_1$, $\lambda_2$, $\lambda_3$, $\lambda_4$ and $\lambda_5$. Additional optical inputs $11, \ldots, 1n$ and $21, \ldots, 2n$ are multiplexed in CD multiplexers 109 of FIG. 1. The outputs of the two CD multiplexers 109 of FIG. 9 are each connected to one of two wavelength converters 501 which have outputs at wavelengths $\lambda_4$ and $\lambda_5$ respectively. Three filters 901 are used to preserve the $\lambda_1$, $\lambda_2$ and $\lambda_3$ components of the incoming light signal. The outputs of these filters 901 and the two CD multiplexers 109, are then combined in passive coupler 103 to produce a lightwave output at wavelengths $\lambda_1$, $\lambda_2$, $\lambda_3$, $\lambda_4$ and $\lambda_5$. To extract signals from the incoming lightwave, the incoming lightwave is connected to passive splitter 105 which is connected to a plurality of CD/WD demultiplexers 205 to generate output signals $1, \ldots, p$. This is similar to the method of extracting signals described with respect to FIG. 4. This arrangement then permits another source to generate signals conveyed at the $\lambda_1$, $\lambda_2$, and $\lambda_3$ wavelengths, and the source of FIG. 9 to generate signals conveyed at the $\lambda_4$ and $\lambda_5$ wavelengths. The optical circuitry of the multiplexer arrangement of FIG. 9 extracts input signals carried at the $\lambda_1$, $\lambda_2$ and $\lambda_3$ wavelengths and injects new optical signals at $\lambda_4$ and $\lambda_5$ wavelengths. The light may be carried, for example, over a photonic ring interconnecting the various signal sources and destinations.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed:

1. A two-stage multiplexer for multiplexing a plurality of input signals to generate an output signal comprising:

a plurality of first means, each means responsive to a plurality of said input signals for generating an intermediate signal comprising a plurality of code division multiplexed signals; and second means for combining the intermediate signals to generate the output signal, comprising a plurality of wavelengths, each wavelength for carrying the intermediate signal of one of the first means;

wherein the input signals comprise modulated optical input signals, and wherein each of the first means comprises:

a plurality of means for phase shifting an optical signal, each means responsive to a modulated optical input signal and to one of a plurality of orthogonal code sequences for generating a modulated lightwave output signal, and third means comprising optical amplification means for combining the modulated lightwave output signals of the plurality of phase shifters for generating the intermediate signal.

2. A two-stage multiplexer for multiplexing a plurality of input signals to generate an output signal comprising:

a plurality of first means, each means responsive to a plurality of said input signals for generating an intermediate signal comprising a plurality of code division multiplexed signals; and second means for combining the intermediate signals to generate the output signal, comprising a plurality of wavelengths, each wavelength for carrying the intermediate signal of one of the first means; wherein the second means comprises:

a plurality of third means, each for converting an incoming lightwave of a first wavelength to an outgoing lightwave of one of a plurality of second wavelengths; and fourth means comprising optical amplification means for combining, the outgoing lightwaves of the plurality of third means for generating the output signal.

3. A signal demultiplexer for extracting an output signal from a multiplexed signal, comprising:

first means for selecting one of a plurality of wavelengths and for generating a first intermediate signal of the one selected wavelength;

second means for combining the first intermediate signal with one of a plurality of orthogonal code sequences to generate a second intermediate signal; and third means for extracting the output signal by combining the second intermediate signal and the multiplexed signal;

wherein the third means comprises a PIN photodiode responsive to the second intermediate signal for extracting the output signal from the multiplexed signal.

4. A photonic signal demultiplexer for extracting a modulated optical signal at a preselected wavelength from a multiplexed optical signal, comprising:

first means responsive to the multiplexed signal for generating a first intermediate signal by selecting one of a plurality of wavelengths of the multiplexed signal;

second means responsive to the first intermediate signal for converting the first intermediate signal to a second intermediate signal at the preselected wavelength; and third means, responsive to the second intermediate signal and to one of a plurality of orthogonal code sequences for generating the modulated optical signal;

wherein the second means comprises an integrated circuit with two multiple quantum well (MQW) diodes connected in series, one of the diodes comprising material responsive to the wavelength of the first intermediate signal, the other diode comprising material responsive to the preselected wavelength.

5. A photonic switch comprising:

a two-stage multiplexer for multiplexing a plurality of input signals to generate a multiplexed signal; and a plurality of demultiplexers each for extracting an output signal from the multiplexed signal;

each of said demultiplexers comprising:

first means for selecting one of a plurality of wavelengths and generating a first intermediate signal of the selected wavelength;

second means for combining the first intermediate signal with one of a plurality of orthogonal code sequences to generate a second intermediate signal; and third means for extracting the output signal by combining the second intermediate signal and the multiplexed signal;

said two-stage multiplexer comprising:

a plurality of fourth means, each responsive to a plurality of said input signals for generating a third intermediate signal comprising a plurality of code division multiplexed signals; and fifth means for combining the third intermediate signals to generate the multiplexed signal comprising a plurality of wavelengths, each wavelength for carrying the signal of one of the fourth means.

6. A photonic signal demultiplexer for extracting an output signal from a multiplexed photonic input signal, comprising:

first means for selecting one of a plurality of wavelengths and for generating a first intermediate signal of the one selected wavelength;

second means for combining the first intermediate signal with one of a plurality of orthogonal code sequences to generate a second intermediate signal; and third means for extracting the output signal by combining the second intermediate signal and the multiplexed signal;

wherein the first means comprises a plurality of lithium niobate optical modulators each responsive to an optical signal of a different one of the plurality of wavelengths for generating an output signal; and a passive optical coupler for combining the output signals from the optical modulators for generating the first intermediate signal;

wherein each orthogonal code sequence comprises a plurality of 1's and a plurality of −1's, and the second means comprises a phase shifter for an optical signal, the phase shifter comprising a lithium niobate crystal with a titanium indiffused wave guide along its length and metallic electrodes connected to the one of a plurality of orthogonal code sequences;

wherein the third means comprises a PIN photodiode responsive to the second intermediate signal for extracting the output signal from the multiplexed signal.

7. A signal demultiplexer for extracting an output signal from a multiplexed signal, comprising:

first means for selecting one of a plurality of wavelengths and for generating a first intermediate signal of the one selected wavelength;

second means for combining the first intermediate signal with one of a plurality of orthogonal code sequences to generate a second intermediate signal; and third means for extracting the output signal by combining the second intermediate signal and the multiplexed signal;

wherein the third means comprises an avalanche photo diode (APD) responsive to the second intermediate signal for extracting the output signal from the multiplexed signal.

8. A two-stage multiplexer for multiplexing a plurality of input signals to generate an output signal comprising:

a plurality of first means, each means responsive to a plurality of said input signals for generating an intermediate signal comprising a plurality of code division multiplexed signals; and second means for combining the intermediate signals to generate the output signal, comprising a plurality of wavelengths, each wavelength for carrying the intermediate signal of one of the first means;

wherein the second means comprises:

a plurality of third means, each for converting an incoming lightwave of a first wavelength to an outgoing lightwave of one of a plurality of second wavelengths; and fourth means for combining, the outgoing lightwaves of the plurality of third means for generating the output signal;

wherein each of the third means comprises an integrated circuit with two multiple quantum well (MQW) diodes connected in series, one of the diodes comprising material responsive to the wavelength of the first intermediate signal, the other diode comprising material responsive to the preselected wavelength.

9. Multiplexer means for deleting output signals from an incoming lightwave signal and adding input signals to an outgoing lightwave signal, comprising:

first means responsive to a plurality of input signals for generating a first intermediate signal comprising a plurality of code division multiplexed signals at a first wavelength;

second means responsive to the first intermediate signal for generating a second intermediate signal at a second wavelength;

third means responsive to the incoming lightwave signal for filtering selected wavelengths to generate third intermediate signals, and fourth means for combining the second and third intermediate signals for generating the outgoing lightwave signal.

10. The multiplexer means of claim 9, wherein the input signals comprise modulated optical input signals, and wherein the first means comprises:

a plurality of means for phase shifting optical signals, each means responsive to a modulated optical input signal and to one of a plurality of orthogonal code sequences for generating a modulated lightwave output signal; and fifth means for combining the modulated lightwave output signals of the plurality of phase shifters for generating the first intermediate signal.

11. The multiplexer means of claim 10 wherein each orthogonal code sequence comprises a plurality of 1's and a plurality of −1's, and each of the means for phase shifting comprises a phase shifter for an optical signal comprising a crystal with an indiffused wave guide along its length and metallic electrodes connected to electrical code division multiplex input signals.

12. The multiplexer means of claim 11 wherein the crystal is a lithium niobate crystal.

13. The multiplexer means of claim 11 wherein the metallic indiffused wave guide comprises titanium as an indiffusion material.

14. The multiplexer means of claim 9, further comprising:

another first means for generating another first intermediate signal at the first wavelength; and another second means, responsive to the another first intermediate signal for generating another second intermediate signal at a third wavelength different from the second wavelength;

wherein the fourth means combines the another second intermediate signal with the second and third intermediate signals for generating the outgoing lightwave signal.

15. The multiplexer means of claim 9 wherein the second means comprises:

an integrated circuit with two multiple quantum well (MQW) diodes connected in series, one of the diodes comprising material responsive to the first wavelength, the other diode comprising material responsive to the second wavelength.

16. The multiplexer means of claim 9 wherein the fourth means comprise passive optical combining means for additively combining the modulated signal to generate the outgoing lightwave signal.

17. The multiplexer means of claim 9 wherein the fourth means comprise optical amplification means for generating the outgoing lightwave signal.

* * * * *